Patented Apr. 22, 1952

2,593,398

UNITED STATES PATENT OFFICE 2,593,398

METHOD OF REDUCING ORES WITHOUT MELTING

Bo Michael Sture Kalling, Domnarvet, Sweden

No Drawing. Application April 5, 1949, Serial No. 85,706. In Sweden June 11, 1943

4 Claims. (Cl. 75—36)

The present invention relates to a method of reducing ores with carbon without melting or sintering, particularly for the production of sponge iron. Attempts to find a technical method based on this principle have so far met with great difficulties since it has not been possible to supply the heat required for carrying out the highly endothermic process fast enough without the risk of sintering together of the ore to lumps or its sticking to the furnace walls.

The type of furnace nearest at hand for carrying out the process is the rotating furnace through which the ore-carbon-mixture is continuously fed while being simultaneously heated to reaction temperature. Through the rotation of the furnace the mixture is maintained in constant motion and the heat supply becomes evenly distributed, which is a necessary requirement in order to avoid local superheating and baking together of the material.

Different ways of supplying the necessary heat have been suggested. According to one known method electric current is conducted through the charge between suitably located electrodes. This procedure has proved capable of preventing sintering particularly if a great excess of carbon is used. However, as the electric current often is a relatively expensive source of heat and the furnace construction is to a certain extent complicated through the means for current supply, a method which does not require the supply of electric energy is often to be preferred. Different methods have also been suggested in which the heat has been supplied by means of burners, placed above the charge preferably in the discharge end of the furnace. In such cases oil or pulverized coal or a gas has been used as fuel. Moreover, it has also been possible to utilize for the process, at least part of the carbon monoxide generated in the charge. The flame from the burner has been directed parallel to the furnace axis and the waste gases have passed out through the feeding end. However, this method of supplying heat involves a heavy drawback in that the furnace walls attain a considerably higher temperature than the charge, causing firm deposits on the the walls, resulting in disturbances of the operation.

The present invention which has for its object to eliminate said drawbacks, relates to a method of reducing ores without melting of sintering by heating a mixture of an ore and fine granular, carbonaceous material in a rotating furnace through which the charge is passed during continued heating. This new method according to the invention is mainly characterized in that the furnace is charged with such an excess of fine granular, carbonaceous material over that required for the heating and reduction, that due to the quantitative relation and the difference in specific gravity between the ore and the carbonaceous material, the charge upon rotation becomes covered by a layer of carbonaceous material preventing reoxidation and sintering, and in that the heat generation is substantially effected by burning part of said carbonaceous material and the carbon monoxide formed during the reduction by means of air or other gas containing free oxygen being blown towards the surface of the said charge and distributed over that part of the length thereof where the highest temperature is to be maintained. The excess of carbon may finally be separated from the metal.

By using this new method, considerable advantages are obtained, among which the following should be pointed out. The heat is generated in direct contact with the charge whereby a good heat transmission is obtained, any risk of unsuitably overheating of the furnace wall being eliminated. The temperature in the different zones of the furnace can be adjusted as desired by controlling the air distribution along the length of the furnace. The carbon content of the charge serves both as reducing agent and as fuel, and thus it is not necessary to supply other fuel but only combustion air to the furnace. The air supply distributed along the length of the furnace further enables a complete combustion of the reaction gas prior to its discharge from the furnace, whereby a good heat economy is obtained. Furthermore, by directing the air jets towards the charge the advantage is obtained that such a rapid and effective combustion occurs that the furnace atmosphere above the charge without difficulty can be kept free from free oxygen which has appeared to be a necessary requirement in order to avoid stickings to the furnace wall.

It was to be expected that the carrying-out of the reduction should be made more difficult or even impossible by blowing free oxygen directly towards the ore-carbon-mixture. In reality, however, the air supply has no disadvantageous influence in this respect, inter alia due to the fact that the ore, being heavier than the carbon, sinks down in the charge the surface layer of which thus substantially will consist of carbon. However, it is of importance that the charge depth is not too small and that the speed of rotation is sufficiently great. By arranging central openings of suitable size for the charging and discharging of the material without difficulty at least 25% of the inner volume of the furnace can be kept filled with charge which is desirable. A certain excess of carbon beyond the carbon required as fuel and reduction agent, should also be used in order to reduce the risks of re-oxidation and sintering. A carbon quantity which exceeds the quantity consumed by at least 50%, has proved desirable. The excess of carbon can afterwards be separated from the sponge iron by magnetic separation and be used again for the process.

Charcoal or wood, such as chips or sawdust as well as fossil carbons, possibly mixed with each other, may be used for the process. If fossil carbon is used, the sulphur content of the product becomes high unless a substance capable of binding sulphur, such as lime, is added. An addition of lime involves an increased tendency for sintering. However, with the method here described the process can be carried out without difficulty even with an addition of lime, which makes the method particularly suitable for use of coke or other carbon of fossil origin. In order to separate the sulfurized lime effectively from the sponge iron after the process, magnetic separation in water suspension has appeared desirable.

The grain size of the ore as well as of the carbon material is of importance. The ore has a less tendency of sintering the coarser the grains are. However, at the same time the reduction time is increased, a fact to which attention should also be paid. If the carbon material is very fine, there is a risk of the dust losses being too great, and, furthermore, it might be difficult to obtain a conversion of all of the carbon monoxide of the gas into carbon dioxide before leaving the furnace. No general rule for the selection of the grain size of the ore and of the carbon material can be given, but this has to be determined in each special case.

The process is carried out most simply in a rotating furnace having an approximately horizontal axis and being provided with central openings for the charging and discharging of the material. The product is preferably discharged via a sluice of known construction which admits of the cooling of the products without the access of air and which also prevents the furnace gases from leaving this way. The combustion air is preferably admitted through a pipe inserted from the feeding end, said pipe being provided with slidably spaced orifices along the entire length thereof, air being blown towards the charge through said openings. The supply pipe may also be composed of a number of concentric or parallel pipes or ducts, each being connected with its individual opening and provided with separate dampers through which the distribution of the air may be controlled also during operation. The innermost orifice should be placed at a certain distance from the discharge end, in order to cause as strongly reducing conditions as possible in the final reduction zone.

In order to obtain a sufficiently rapid combustion of the fuel it must necessarily at least partly be of very fine granular form. If all of the carbon is added with the charge in the feed end, a large quantity of the carbon, however, due to the rotation of the furnace will whirl up in the gas phase and leave the furnace together with the waste gases without partaking in the process. It has therefore appeared suitable to separate out the finest granular carbon material and to introduce it farther along in the furnace in the zone where it is most needed for carrying out the reduction.

This fine granular carbon which is introduced in the reduction zone, however, need not be of the same kind as that added together with the charge. It is only necessary that it is sufficiently easily oxidized, while the carbon included in the charge, which serves primarily to loosen the charge and prevent sintering, can pass unconsumed through the furnace. It is not always necessary to add carbon material to the charge in the feeding end of the furnace. The whole carbon quantity required can often advantageously be added along in the furnace. In this way the possibility of completely burning the reaction gas before it leaves the furnace is increased and the heat economy is improved. In certain cases it may be advantageous to supply part of the carbon together with the air e. g. through the burners directed towards the charge.

If the fuel consists of a pulverulent relatively difficultly combustible material, such as coke or graphite, it has appeared desirable simultaneously to add a quantity of combustible gas or other easily combustible material in order to give the initial temperature required for the complete combustion of the carbon.

If a solid, relatively coarse granular fuel which passes through the furnace without partaking in the reaction to any great extent, as well as a more easily combustible material which serves as the main fuel and reduction agent, are used, the first mentioned fuel without disadvantage may contain sulphur, while the last-mentioned fuel preferably should only contain a small percentage of sulphur if a product with a low sulphur content is to be produced.

In order to obtain a rapid reaction, the temperature should be held as high as possible.

The method can also be used in such cases where it is difficult to obtain a product which may be directly used for the production of steel. The simplicity of the method and the possibility of using inexpensive reducing agents, such as coke dust, makes possible such low manufacturing costs that the obtained sponge iron contaminated by sulphur and/or gangue can advantageously be refined by melting to pig iron in a separate furnace.

The method is not limited to the reduction of iron ore only, but may also be used for ores of other metals which can be reduced without melting in the presence of carbon.

I claim:

1. A method of reducing metal oxide ores which comprises establishing and maintaining a body of a mixture of ore and a solid reducing agent in loose granular form in a substantially horizontal rotary cylindrical furnace chamber by supplying ore and reducing agent at one end of said body and withdrawing reduced ore together with remaining reducing agent from the other end of said body, the reducing agent being added in an excess of at least 50 per cent over the amount required for the reduction of the ore plus that consumed by combustion, continuously rotating the reaction chamber around its substantially horizontal axis thereby causing a tumbling action within said body the upper boundary of which takes the shape of a sloping surface of rolling and sliding particles substantially consisting of reducing agent, heating at least a portion of said sloping surface to incandescing temperature and maintaining incandescence by continuously blowing oxygen containing gas onto said surface portion thereby simultaneously burning combustible gases evolving from said body and the solid fuel particles in said surface portion and thereby transmitting heat necessary for the reduction of the ore to the interior of said body.

2. Method as defined in claim 1 in which at least a part of the carbonaceous material is introduced into the furnace chamber in admixture with the ore.

3. Method as defined in claim 1 in which at least a part of the carbonaceous material is introduced into the furnace chamber separately from the ore.

4. Method as defined in claim 1 in which said carbonaceous material is introduced partly in admixture with the ore and partly separately from the ore.

BO MICHAEL STURE KALLING.

REFERENCES CITED

The following references are of record in the file of this patent:

UNITED STATES PATENTS

| Number | Name | Date |
|---|---|---|
| 1,033,051 | Grondal | July 16, 1912 |
| 1,564,730 | Walden | Dec. 8, 1925 |
| 1,760,078 | Newkirk | May 27, 1930 |
| 1,848,710 | Gustafsson | Mar. 8, 1932 |
| 1,871,848 | Gustafsson | Aug. 16, 1932 |
| 1,924,034 | Folliet et al. | Aug. 22, 1933 |
| 1,964,402 | Kalling et al. | June 26, 1934 |
| 2,201,900 | Kalling et al. | May 21, 1940 |
| 2,277,067 | Brassert | Mar. 24, 1942 |

FOREIGN PATENTS

| Number | Country | Date |
|---|---|---|
| 68,176 | Norway | Aug. 7, 1944 |